(12) United States Patent
Fukagawa et al.

(10) Patent No.: US 8,159,634 B2
(45) Date of Patent: Apr. 17, 2012

(54) LIQUID CRYSTAL DISPLAY DEVICE

(75) Inventors: Nobutaka Fukagawa, Minami-Ashigara (JP); Hirofumi Toyama, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 622 days.

(21) Appl. No.: 12/335,740

(22) Filed: Dec. 16, 2008

(65) Prior Publication Data
US 2009/0161043 A1    Jun. 25, 2009

(30) Foreign Application Priority Data
Dec. 19, 2007   (JP) .................................. 2007-327693

(51) Int. Cl.
*G02F 1/1335*   (2006.01)
(52) U.S. Cl. ............................ 349/96; 349/117; 349/119
(58) Field of Classification Search ......................... None
See application file for complete search history.

(56) References Cited

U.S. PATENT DOCUMENTS
2003/0020208 A1   1/2003   Tasaka et al.
2006/0257589 A1*  11/2006  Hayashi et al. ................ 428/1.2

FOREIGN PATENT DOCUMENTS
JP   2003-170492 A   6/2003
JP   2006-241293 A   9/2006
WO   WO 2006/093346 A1   9/2006

* cited by examiner

*Primary Examiner* — Lucy Chien
(74) *Attorney, Agent, or Firm* — Buchanan Ingersoll & Rooney PC

(57) ABSTRACT

A liquid crystal display device includes: a backlight; a liquid crystal cell; a first polarizing plate provided between the liquid crystal cell and the backlight; a second polarizing plate provided in opposite side to the first polarizing plate with respect to the liquid crystal cell; a first retardation film provided between the first polarizing plate and the liquid crystal cell; and a second retardation film provided between the second polarizing plate and the liquid crystal cell, wherein a relationship represented by the following formula (1) is satisfied:

$$1\times10^{-6}/°C. \leq EC2\max - EC1\max \leq 50\times10^{-6}/°C. \quad (1)$$

in which $EC1\max$ represents a maximal linear thermal expansion coefficient of the first retardation film, and $EC2\max$ represents a maximal linear thermal expansion coefficient of the second retardation film.

8 Claims, 1 Drawing Sheet

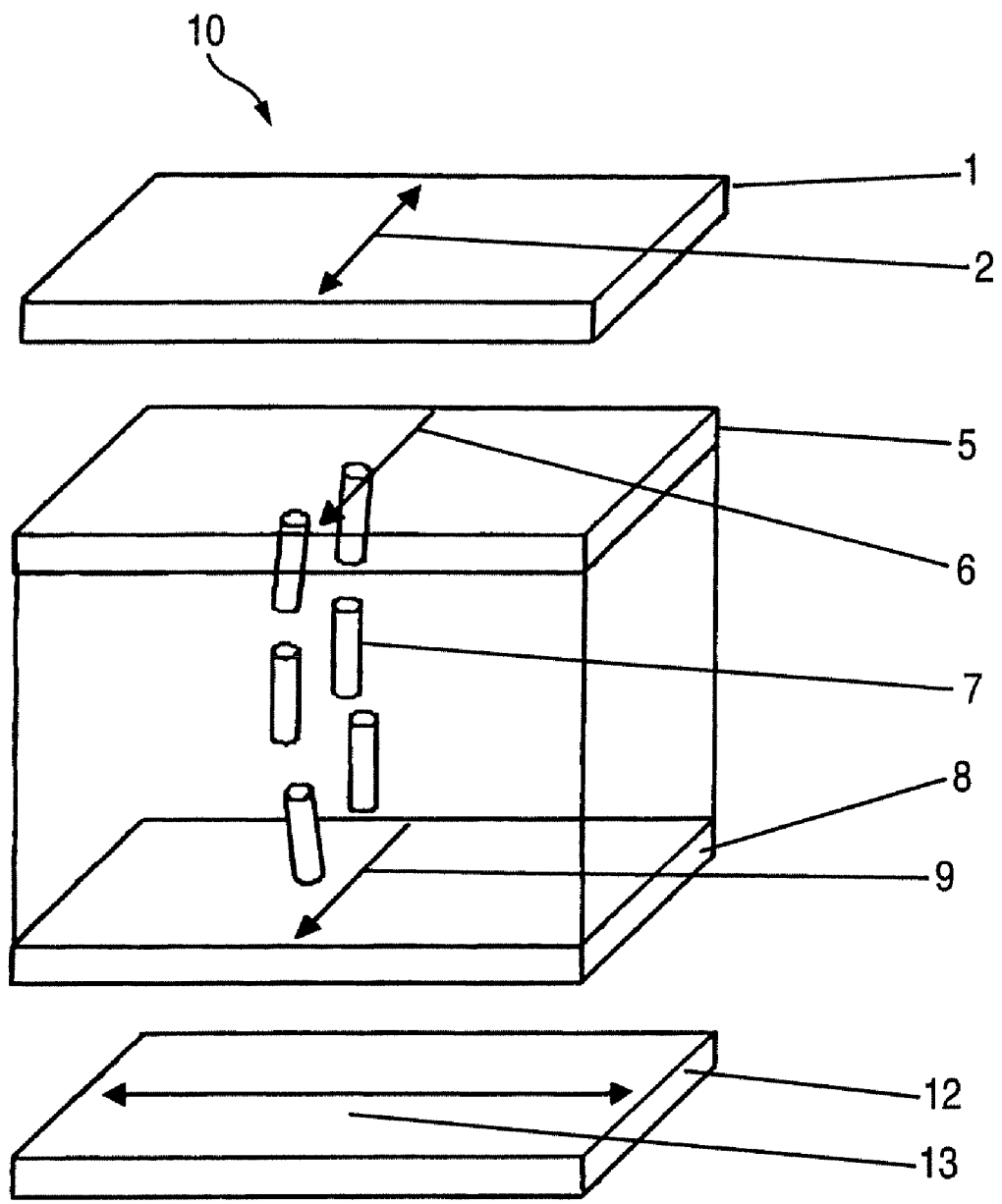

LIQUID CRYSTAL DISPLAY DEVICE

FIELD OF THE INVENTION

This invention relates to a liquid crystal display device. In particular, it relates to a liquid crystal display device which is excellent in viewing angle property and shows little light leakage even when lighted over a long time.

BACKGROUND OF THE INVENTION

The application of liquid crystal display devices has increased year by year as electric power-saving and space-saving image display devices. It has been considered that liquid crystal display devices have a large drawback, i.e., having a high viewing angle dependency of images. However, VA mode liquid crystal display devices with wide viewing angle become practically usable in recent years and thus the demand for liquid crystal display devices has been rapidly increasing in such a market of, for example, televisions with a need for high-grade images.

In general, VA mode liquid crystal display devices are superior to other liquid crystal display mode devices in having a high contrast. At the same time, however, VA mode liquid crystal display devices suffer from a problem of showing large changes in contrast and hue depending on the viewing angle.

In order to overcome this problem, it has been a common practice to use stretched polymer films as optical compensatory films, since optical compensatory films having uniform qualities can be easily and economically obtained thereby, as disclosed in JP-A-2003-170492 (corresponding to US2003/0020208A1) and JP-A-2006-241293 (corresponding to WO2006/093346A1).

With the recent tendency toward large-screen display devices to be used mainly in big screen TVs, liquid crystal display devices having improved display fidelity are required. Also, optical compensatory films having higher retardation are required. To increase the retardation in such a stretched film disclosed above, it is a common practice to elevate the stretching ratio to thereby elevate the degree of orientation of the polymer in the stretching direction. However, a liquid crystal display device using an optical compensatory film produced by this method has a problem of frequently showing light leakage when lighted over a long time and, therefore, further improvement is needed.

SUMMARY OF THE INVENTION

An object of the present invention is to provide a liquid crystal display device which can be conveniently and economically produced, has a low viewing angle dependency and shows little light leakage even when lighted over a long time.

As the results of intensive studies, the present inventors have clarified that light leakage occurring in lighting a liquid crystal display device over a long time is considerably affected by unevenness in temperature within the liquid crystal display device and dimensional changes in retardation films caused by heat. Thus, they have found out that this problem can be overcome by optimizing the relative relationship between the linear thermal expansion coefficients of retardation films.

The above problem can be solved by the following aspects [1] to [6].

[1] A liquid crystal display device comprising a backlight, a liquid crystal cell, a first polarizing plate provided between the liquid crystal cell and the backlight, a second polarizing plate provided in the opposite side to the first polarizing plate with respect to the liquid crystal cell, a first retardation film provided between the first polarizing plate and the liquid crystal cell and a second retardation film provided between the second polarizing plate and the liquid crystal cell, wherein, when the maximal linear thermal expansion coefficient of the first retardation film is referred to as EC1max while the maximal linear thermal expansion coefficient of the second retardation film is referred to as EC2max, EC1max and EC2max satisfy the requirement represented by the following formula (1):

$$1 \times 10^{-6}/°C. \leq EC2max - EC1max \leq 50 \times 10^{-6}/°C. \quad \text{Formula (1)}$$

[2] The liquid crystal display device according to [1] disclosed above, wherein the transmission axis of the first polarizing plate is substantially parallel to the slow axis of the first retardation film and the transmission axis of the second polarizing plate is substantially parallel to the slow axis of the second retardation film.

[3] The liquid crystal display device according to [1] or [2] disclosed above, wherein at least one of the first retardation film and the second retardation film also serves as a protective film for the polarizing plate.

[4] The liquid crystal display device according to any one of [1] to [3] disclosed above, wherein at least one of the first retardation film and the second retardation film is a cellulose acylate film.

[5] The liquid crystal display device according to any one of [1] to [4] disclosed above, wherein at least one of the first retardation film and the second retardation film is a cellulose acylate film stretched in the width direction.

[6] The liquid crystal display device according to any one of [1] to [5] disclosed above, wherein the liquid crystal cell is a VA mode liquid crystal cell.

According to the present invention, it is possible to provide a liquid crystal display device which can be conveniently and economically produced, has a low viewing angle dependency and shows little light leakage even when lighted over a long time.

BRIEF DESCRIPTION OF THE DRAWINGS

FIG. 1 is a schematic view showing an example of the liquid crystal display device according to the present invention.

DESCRIPTION OF THE REFERENCE NUMERALS

1 Second polarizing plate (polarizing plate closer to viewer's side)
2 Direction of absorption axis of second polarizing plate
5 Upper electrode substrate of liquid crystal cell
6 Direction of orientation-regulation of upper substrate
7 Liquid crystal layer
8 Lower electrode substrate of liquid crystal cell
9 Direction of orientation-regulation of lower substrate
10 Liquid crystal display device
12 First polarizing plate (polarizing plate closer to backlight)
13 Direction of absorption axis of first polarizing plate

DETAILED DESCRIPTION OF THE INVENTION

Next, the embodiments of the present invention will be described in greater detail. In the present specification, the term "from (a numerical value) to (a numerical value)" is used to mean a range including the numerical values before and after "to" as a lower limit value and an upper limit value, respectively.

In the invention, the term "substantially parallel" is used to mean that the angle between two axes is −10° or larger but not larger than +10°.

<<Liquid Crystal Display Device>>

The liquid crystal display device according to the invention comprises a backlight, a liquid crystal cell, a first polarizing plate provided between the liquid crystal cell and the backlight, a second polarizing plate provided in the opposite side to the first polarizing plate with respect to the liquid crystal cell, a first retardation film provided between the first polarizing plate and the liquid crystal cell and a second retardation film provided between the second polarizing plate and the liquid crystal cell, wherein, when the maximal linear thermal expansion coefficient of the first retardation film is referred to as EC1max while the maximal linear thermal expansion coefficient of the second retardation film is referred to as EC2max, EC1max and EC2max satisfy the requirement represented by the following formula (1).

$$1\times10^{-6}/°C. \leq EC2max - EC1max \leq 50\times10^{-6}/°C. \quad \text{Formula (1)}$$

In general, when a liquid crystal display device is lighted over a long time, the temperature in the liquid crystal display device is elevated due to the heat generated from the backlight. When an optically compensatory film (the first retardation film) provided between a liquid crystal panel and the backlight is compared with another optically compensatory film (the second retardation film) provided in the opposite side to the backlight with respect to the liquid crystal panel in this step, it is frequently observed that the optically compensatory film closer to the backlight has a higher temperature.

By controlling in such a manner that the linear thermal expansion coefficients of the first retardation film and the second retardation film satisfy the requirement represented by the formula (1), dimensional changes caused by heat can be stabilized and thus the occurrence of heat leakage can be prevented.

It is preferable that the formula (1) is the following formula (1)', more preferably the following formula (1)".

$$2\times10^{-6}/°C. \leq EC2max - EC1max \leq 40\times10^{-6}/°C. \quad \text{Formula (1)'}$$

$$3\times10^{-6}/°C. \leq EC2max - EC1max \leq 30\times10^{-6}/°C. \quad \text{Formula (1)"}$$

By controlling EC2max−EC1max within the range as defined above, heat leakage can be regulated.

<Thermal Expansion Coefficient of Film>

The linear thermal expansion coefficient of a retardation film to be used in the liquid crystal display device according to the invention can be measured as a dimensional change per unit temperature in the case of elevating the temperature under a constant load with the use of a thermomechanical measurement device.

The thermal expansion coefficient of a film can be controlled by varying both of the materials and the production method. A polymer material constituting the film can be appropriately selected based on the known thermal expansion coefficient. It is also possible to design the structure of the polymer material depending on the finding that a polymer material having a lower glass transition temperature tends to show the larger thermal expansion coefficient. In a cellulose acylate film, it is known that the glass transition temperature tends to lower with an increase in the acylation degree and that, in the case where the acyl group is an aliphatic one, the glass transition temperature tends to lower with an increase in the carbon atom number in the acyl substituent. Therefore, a cellulose acylate having a desired thermal expansion coefficient can be designed by appropriately selecting the substituent and substitution degree.

On the other hand, the thermal expansion coefficient of a film can be controlled by stretching the film too. By stretching the film in a definite direction, the thermal expansion coefficient in the direction parallel to the stretching direction decreases, while the thermal expansion coefficient in the direction perpendicular to the stretching direction increases. This tendency becomes obvious with an increase in the stretching ratio.

Next, the first retardation film and the second retardation film preferably used in the liquid crystal display device according to the invention will be described in greater detail.

<Retardation of Retardation Film>

It is preferable that the retardations of the first retardation film and the second retardation film in the invention satisfy the requirements represented by the following formulae (3) and (4).

$$10\text{ nm} \leq Re(548) \leq 200\text{ nm} \quad \text{Formula (3)}$$

$$20\text{ nm} \leq Rth(548) \leq 400\text{ nm} \quad \text{Formula (4)}$$

By using retardation films the retardations of which satisfy the requirements of the above formulae (3) and (4), a liquid crystal display device showing small changes in contrast and hue can be obtained.

It is preferable that the above formula (3) is the following formula (3)', more preferably the following formula (3)".

$$20\text{ nm} \leq Re(548) \leq 150\text{ nm} \quad \text{Formula (3)'}$$

$$30\text{ nm} \leq Re(548) \leq 100\text{ nm} \quad \text{Formula (3)"}$$

It is preferable that the formula (4) is the following formula (4)', more preferably the following formula (4)".

$$30\text{ nm} \leq Rth(548) \leq 300\text{ nm} \quad \text{Formula (4)'}$$

$$50\text{ nm} \leq Rth(548) \leq 200\text{ nm} \quad \text{Formula (4)"}$$

In the present specification, $Re(\lambda)$ and $Rth(\lambda)$ are an in-plane retardation and a retardation in a thickness direction, respectively, at a wavelength of $\lambda$. $Re(\lambda)$ is measured by applying light having a wavelength of $\lambda$ nm to a film in the normal direction of the film, using KOBRA 21ADH or WR (manufactured by Oji Scientific Instruments).

When a film to be measured is represented by a monoaxial or biaxial index ellipsoid, $Rth(\lambda)$ of the film is calculated as follows.

$Rth(\lambda)$ is calculated by KOBRA 21ADH or WR based on six $Re(\lambda)$ values that are measured for incoming light of a wavelength of $\lambda$ nm in six directions which are decided at intervals of 10 degrees in rotation from 0° to 50° with respect to the normal direction of a sample film using an in-plane slow axis (decided by KOBRA 21ADH or WR) as an inclination axis (a rotation axis; defined in an arbitrary in-plane direction if the film has no slow axis in plane), a value of hypothetical mean refractive index, and a value entered as a thickness value of the film.

In the case of a film having a direction in which the retardation value is zero at a certain inclination angle, around the in-plane slow axis from the normal direction as the rotation axis disclosed above, the retardation value at the inclination angle larger than the inclination angle to give a zero retardation is changed to negative data and then calculation is made by KOBRA 21ADH or WR.

Around the slow axis as the inclination angle (rotation angle) of the film (in the case where the film does not have a slow axis, its rotation axis may be in any in-plane direction of the film), the retardation values are measured in any desired inclined two directions. Then, Rth can be calculated according to the following formulae (21) and (22) on the basis of the data obtained above and the estimated value of the mean refractive index and the inputted film thickness.

$$Re(\theta) = \left[ nx - \frac{(ny \times nz)}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Formula (21)

In the formula (21), Re(θ) represents a retardation value in the direction inclined by an angle θ from the normal direction.

In the formula (21), nx represents a refractive index in the in-plane slow axis direction. ny represents a refractive index in the in-plane direction perpendicular to nx. nz represents a refractive index in the direction perpendicular to nx and ny. d is a film thickness (nm).

$$Rth = ((nx+ny)/2 - nz) \times d$$

Formula (22)

In the case where the film to be measured is not expressed by a monoaxial or biaxial index ellipsoid (i.e., a film having no optic axis), then Rth(λ) of the film is calculated as follows.

Rth(λ) is calculated by KOBRA 21ADH or WR based on 11 Re(λ) values that are measured for incoming light of a wavelength of λ nm in 11 directions which are decided at intervals of 10 degrees in rotation from −50° to +50° with respect to the normal direction of a sample film using an in-plane slow axis (decided by KOBRA 21ADH or WR) as an inclination axis (a rotation axis), a value of hypothetical mean refractive index, and a value entered as a thickness value of the film.

In the above-described measurement, the hypothetical value of mean refractive index is available from values listed in Polymer Handbook (John Wiley & Sons, Inc.) or catalogues of various optical films. The refractive indices of films having unknown mean refractive indices can be measured by using an Abbe refract meter. Mean refractive indices of some major optical films are as follows: cellulose acylate (1.48), cycloolefin polymer (1.52), polycarbonate (1.59), polymethylmethacrylate (1.49) and polystyrene (1.59). By inputting the hypothetical value of mean refractive index and the film thickness, KOBRA 21ADH or WR calculates nx, ny and nz. Base on thus-calculated nx, ny and nz, Nz=(nx−nz)/(nx−ny) is further calculated.

The hypothetical value of mean refractive index is available from values listed in Polymer Handbook (John Wiley & Sons, Inc.) or catalogues of various optical films. The refractive indices of films having unknown mean refractive indices can be measured by using an Abbe refract meter.

Mean refractive indices of some major optical films are cited below by way of example: cellulose acylate (1.48), cycloolefin polymer (1.52), polycarbonate (1.59), polymethylmethacrylate (1.49) and polystyrene (1.59). By inputting the hypothetical value of mean refractive index and the film thickness, calculates nx (refractive index in film forming direction), ny (refractive index in width direction) and nz (refractive index in thickness direction) can be calculated by KOBRA WR.

<Polymer Film>

It is preferable that the first retardation film and the second retardation film of the invention are stretched polymer films. As the polymer, use can be made of various polymers such as norbornene type polymers, cellulose acylate and so on, in addition to polycarbonate and polyimide.

From the standpoint of thinning the liquid crystal display device, it is preferable that the first retardation film of the invention also serves as a protective film for the polarizing plate.

In the invention, it is preferable that at least one of the first retardation film and the second retardation film is a cellulose acylate film.

Cellulose acylate films are particularly preferred since the characteristics thereof (for example, processability for a polarizing plate) are suitable for a protective film for the polarizing plate and they can be produced form inexpensive starting materials.

Next, cellulose acylate films preferably usable as the first retardation film and the second retardation film in the invention will be described in greater detail.

[Cellulose Acylate Film]

First, cellulose acylate that is usable in the first retardation film and the second retardation film in the invention will be described.

The substitution degree of cellulose acylate means the percentage of acylation of three hydroxyl groups existing in the constitutional unit ((β)1,4-glycosidically-bound glucose) of cellulose. The substitution degree (acylation degree) can be calculated by measuring the amount of binding aliphatic acid per constitutional unit mass of cellulose. The measurement can be carried out according to "ASTM D817-91".

The cellulose acylate to be used in the first retardation film and the second retardation film in the invention has the acetylation degree of preferably from 2.00 to 2.99. It is more preferable that the above-described acetylation degree is 2.2 to 2.96. Further, it is preferable that the ratio of the acetylation degree at the 6-position to the total acetylation degree is 0.25 or more, still preferably 0.3 or more.

Another cellulose acylate to be preferably used in the first retardation film and the second retardation film in the invention is a mixed aliphatic acid ester having the acylation degree of from 2.0 to 2.9 and has an acyl group having 3 to 4 carbon atoms in the acetyl group. It is more preferable that the acetylation degree of the above-described mixed aliphatic acid ester is 2.20 to 2.85, most preferably 2.3 to 2.8. The acetylation degree is preferably less than 2.5, more preferably less than 1.9.

It is preferable that the cellulose acylate to be used in the first retardation film and the second retardation film in the invention has a mass-average polymerization degree of from 250 to 800, more preferably from 300 to 600.

It is preferable that the cellulose acylate to be used in the first retardation film in the invention has a number-average molecular weight of from 40,000 to 200,000, more preferably from 50,000 to 150,000, and most preferably from 60,000 to 100,000.

It is preferable that the cellulose acylate to be used in the second retardation film in the invention has a number-average molecular weight of from 70,000 to 230,000, more preferably from 75,000 to 230,000, and most preferably from 780,000 to 120,000.

[Production of First Retardation Film and Second Retardation Film]

Next, a method of producing the first retardation film and the second retardation film in the invention will be described in detail.

The first retardation film and the second retardation film in the invention can be produced by the solvent casting method. In the solvent casting method, the film is produced by using a solution (dope) prepared by dissolving cellulose acylate in an organic solvent.

The above-described organic solvent preferably includes a solvent selected from an ether having from 3 to 12 carbon atoms, a ketone having from 3 to 12 carbon atoms, an ester having from 3 to 12 carbon atoms, and a halogenated hydrocarbon having from 1 to 6 carbon atoms.

The above-described ether, ketone and ester may each have a cyclic structure. A compound containing any two or more of functional groups of the ether, ketone and ester disclosed above (that is, —O—, —CO—, and —COO—) can also be used as the organic solvent. The above-described organic solvent may contain other functional group such as an alcoholic hydroxyl group. In the case of an organic solvent containing two or more kinds of functional groups, it is preferable that the number of carbon atom thereof falls within the above-described preferred range of the number of carbon atom of the solvent containing any functional group.

Examples of the above-described ether having from 3 to 12 carbon atoms include diisopropyl ether, dimethoxymethane, dimethoxyethane, 1,4-dioxane, 1,3-dioxolan, tetrahydrofuran, anisole, and phenetole.

Examples of the above-described ketone having from 3 to 12 carbon atoms include acetone, methyl ethyl ketone, diethyl ketone, diisobutyl ketone, cyclohexanone, and methylcyclohexanone.

Examples of the above-described ester having from 3 to 12 carbon atoms include ethyl formate, propyl formate, pentyl formate, methyl acetate, ethyl acetate, and pentyl acetate.

Examples of the organic solvent containing two or more kinds of functional groups include 2-ethoxyethyl acetate, 2-methoxyethanol, and 2-butoxyethanol.

It is preferable that the number of carbon atoms of the halogenated hydrocarbon is 1 or 2, more preferably 1. The halogen of the halogenated hydrocarbon is preferably chlorine. The proportion of the hydrogen atom of the halogenated hydrocarbon that is substituted by the halogen atom is preferably from 25 to 75% by mole, more preferably from 30 to 70% by mole, further preferably from 35 to 65% by mole, and most preferably from 40 to 60% by mole. Methylene chloride is a representative halogenated hydrocarbon.

It is also possible to use a mixture of two or more kinds of organic solvents.

The cellulose acylate solution (dope) can be prepared by a commonly employed method which comprises treating at a temperature of 0° C. or higher (normal temperature or high temperature). The preparation of the cellulose acylate solution can be carried out by using a preparation method of a dope and a device commonly employed in the solvent casting method. In the case of the common method, it is preferred to use a halogenated hydrocarbon (in particular, methylene chloride) as the organic solvent.

The amount of the cellulose acylate is preferably adjusted such that it is contained in an amount of from 10 to 40% by mass in the resulting cellulose acylate solution (dope). The amount of the cellulose acylate is more preferably from 10 to 30% by mass. An arbitrary additive as will be described later may be added in the organic solvent (main solvent).

The cellulose acylate solution can be prepared by stirring the cellulose acylate together with the organic solvent at the normal temperature (from 0 to 40° C.). The solution with high concentration may be stirred under a pressurizing and heating condition. More specifically, the cellulose acylate and the organic solvent are charged in a pressure vessel, and after air-tightly closing the vessel, the mixture is stirred under elevated pressure while heating at a temperature in the range of from the boiling point of the solvent at the normal temperature to a temperature at which the solvent is not boiled. The heating temperature is preferably 40° C. or higher, more preferably from 60 to 200° C., and more preferably from 80 to 110° C.

The individual components may be previously roughly mixed together and then charged in the vessel. Alternatively, they may be successively charged in the vessel. The vessel must be constructed in such a manner as allowing the achievement of stirring. The vessel can be pressurized by injecting an inert gas such as a nitrogen gas. Furthermore, an increase in the vapor pressure of the solvent due to heating may be utilized. Alternatively, after air-tightly closing the vessel, the individual components may be added under pressurizing.

In the case of heating, it is preferable that the heating is carried out from the outside of the vessel. For example, use can be made of a jacket type heating device. Furthermore, the whole vessel can be heated by providing a plate heater in the outside of the vessel, piping and circulating a liquid.

It is preferred to provide a stirring blade in the inside of the vessel and perform stirring using it. As the stirring blade, one having enough length to reach the vicinity of the wall of the vessel is preferable. It is preferred to provide a scraping blade for renewing a liquid film on the wall of the vessel.

The vessel may be equipped with a measuring instrument such as a pressure gauge, a thermometer, etc. The individual components are dissolved in the solvent within the vessel. The dope thus prepared is cooled and then taken out from the vessel, or is taken out from the vessel and then cooled by using a heat exchanger, etc.

It is also possible to prepare the cellulose acylate solution by the cold dissolution method. According to the cold dissolution method, it is possible to dissolve the cellulose acylate even in an organic solvent in which the cellulose acylate can be hardly soluble by a usual dissolution method. Also, the cold dissolution method is also effective in rapidly obtaining a uniform solution even in the case of using a solvent in which the cellulose acylate is soluble by a usual dissolution method.

In the cold dissolution method, the cellulose acylate is first added in portions to an organic solvent at room temperature while stirring. It is preferred to control the amount of the cellulose acylate so that the cellulose acylate content attains from 10 to 40% by mass in the mixture. It is more preferable that the content of the cellulose acylate is from 10 to 30% by mass. Moreover, an arbitrary additive as will be described hereinafter may be added to the mixture.

Next, the mixture is cooled to from −100 to −10° C. (preferably from −80 to −10° C., more preferably from −50 to −20° C., and most preferably from −50 to −30° C.). The cooling can be carried out in, for example, a dry ice-methanol bath (−75° C.) or a cooled diethylene glycol solution (−30 to −20° C.). The mixture of the cellulose acylate and the organic solvent solidifies by cooling.

The cooling speed is preferably 4° C./minute or more, more preferably 8° C./minute or more, and most preferably 12° C./minute or more. Although a higher cooling speed is the more preferable, 10,000° C./second is a theoretical upper limit thereof, 1,000° C./second is a technical upper limit thereof, and 100° C./second is a practical upper limit thereof. The cooling speed is a value obtained by dividing the difference between the temperature at the time of starting the cooling and the final cooling temperature by the time for reaching the final cooling temperature from the start of the cooling.

In addition, when the cooled mixture is heated to from 0 to 200° C. (preferably from 0 to 150° C., more preferably from 0 to 120° C., and most preferably from 0 to 50° C.), the cellulose acylate is dissolved in the organic solvent. The temperature may be elevated merely by allowing the mixture to stand at room temperature or by heating it in a warm bath. The heating speed is preferably 4° C./minute or more, more preferably 8° C./minute or more, and most preferably 12° C./minute or more. Although a higher heating speed is the more preferable, 10,000° C./sec is a theoretical upper limit thereof, 1,000° C./sec is a technical upper limit thereof, and 100° C./sec is a practical upper limit thereof. The heating speed is a value obtained by dividing the difference between the temperature at the time of starting the heating and the final heating temperature by the time for reaching the final heating temperature from the start of the heating.

Thus, a uniform cellulose acylate solution can be obtained. In the case where dissolution is insufficient, the cooling or heating operation may be repeated. Whether or not the dissolution is sufficient can be judged simply by observing the appearance of the solution with the naked eye.

In the cold dissolution method, in order to avoid the contamination with water due to dew condensation during the cooling period, it is desirable to use a closed vessel. Furthermore, in the cooling or heating operation, the dissolution time can be shortened by carrying out pressurization at the time of cooling or reducing the pressure at the time of heating. In carrying out the pressurization or reducing the pressure, it is desirable to use a pressure vessel.

According to the measurement by a differential scanning calorimeter (DSC), a 20% by mass solution prepared by dissolving cellulose acylate (degree of acetylation: 60.9%, viscosity-average polymerization degree: 299) in methyl acetate by the cold dissolution method has a pseudo phase transition point between a sol state and a gel state is present at around 33° C. At a temperature not exceeding this point, the solution is in a uniform gel state. Accordingly, it is preferable to store this solution at a temperature of the pseudo phase transition point or higher, and preferably at a temperature of (gel phase transition temperature) plus about 10° C. However, this pseudo phase transition point varies depending on the degree of acetylation and viscosity-average polymerization degree of the cellulose acylate, the concentration of the solution and the organic solvent employed.

A first retardation cellulose acylate film is produced from the thus prepared cellulose acylate solution (dope) by the solvent casting method. The dope is cast on a drum or a band, and then the solvent is vaporized to form the film. It is preferred to adjust the concentration of the dope before casting so that the solid content amounts to 18 to 35%. It is preferred to finish the surface of the drum or band in a specular state. It is preferred to cast the dope on a drum or a band at a surface temperature of not higher than 10° C.

A drying method available in the solvent casting method is described in U.S. Pat. Nos. 2,336,310, 2,367,603, 2,492,078, 2,492,977, 2,492,978, 2,607,704, 2,739,069 and 2,739,070, U.K. Patents Nos. 640,731 and 736,892, JP-B-45-4554, JP-B-49-5614, JP-A-60-176834, JP-A-60-203430, and JP-A-62-115035. Drying on the band or drum can be carried out by blowing air or an inert gas such as nitrogen thereto.

The thus obtained film is stripped off from the drum or band and dried in a high-temperature air while varying the temperature successively from 100° C. to 160° C., whereby the residual solvent can be vaporized. This method is disclosed in JP-B-5-17844. According to this method, the time from casting until stripping off can be shortened. In order to carry out this method, the dope must be gelled at the surface temperature of the drum or band at the casting.

By using the thus prepared cellulose acylate solution (dope), two or more layers may be cast so as to form a film. In this case, it is preferred to prepare the first retardation cellulose acylate film by the solvent casting method. The dope is cast on a drum or a band, and the solvent is vaporized to form a film. It is preferred to adjust the concentration of the dope before casting so that the solid content ranges from 10 to 40%. It is preferred to finish the surface of the drum or band in a specular state.

In the case of casting plural cellulose acylate solutions in two or more layers, a film may be prepared by casting solutions containing a cellulose acylate respectively from plural casting nozzles capable of casting plural cellulose acylate solutions and provided at intervals in the advancing direction of a support while laminating. For this purpose, use can be made of, for example, methods disclosed in JP-A-61-158414, JP-A-1-122419 and JP-A-11-198285. Furthermore, a film can be formed by casting cellulose acylate solutions from two casting nozzles. For this purpose, use can be made of, for example, methods disclosed in JP-B-60-27562, JP-A-61-94724, JP-A-61-947245, JP-A-61-104813, JP-A-61-158413 and JP-A-6-134933. Moreover, use can be made of a casting method of a film which comprises encompassing a flow of a high-viscosity cellulose acylate solution in a low-viscosity cellulose acylate solution and simultaneously extruding the high-viscosity and low-viscosity cellulose acylate solutions, disclosed in JP-A-56-162617.

Furthermore, a film can be prepared by a method which comprises, using two casting nozzles, forming a film on a support from a first casting nozzle, then stripping it off and carrying out second casting in the side being in contact with the support surface. An example of such a method is disclosed in JP-B-44-20235.

As the cellulose acylate solutions to be cast, either the same solution or different cellulose acylate solutions may be used. To impart functions to the multiple cellulose acylate layers, the cellulose acylate solutions respectively being adaptive for the functions may be extruded from the respective casting nozzles. In addition, the cellulose acylate solutions of the invention can be cast at the same time with other functional layers (for example, an adhesive layer, a dye layer, an antistatic layer, an antihalation layer, an ultraviolet absorbing layer, a polarizing layer and the like).

By using a conventional single-layered solution, it is necessary to extrude a high-viscosity cellulose acylate solution having a high concentration in order to attain a necessary film thickness. In this case, there often arises a problem that solids are formed due to the poor stability of the cellulose acylate solution, thereby causing spitting or failure of flatness. As a method for overcoming this problem, it is proposed that, by casting plural cellulose acylate solutions from casting nozzles, high-viscosity solutions can be simultaneously extruded on the support and the flatness becomes improved so that a planar film can be prepared. Moreover, by using the concentrated cellulose acylate solutions, the drying load can be reduced, and the film can be produced at an elevated speed.

These steps from casting until post-drying may be carried out either in an air atmosphere or in an inert gas (for example, nitrogen) atmosphere. As a winding machine to be used for the production of the first retardation cellulose acylate film in the invention, use can be made of commonly used winding machines. The winding up can be conducted by a winding method such as a constant tension method, a constant torque method, a taper tension method, and a program tension control method with a fixed internal stress.

[Additives]

The first retardation cellulose acylate film and second retardation cellulose acylate film of the invention can contain additive(s).

(Retardation Developer)

It is preferable that the first retardation cellulose acylate film and second retardation cellulose acylate film of the invention can contain a retardation developer. The term "retardation developer" means a compound capable of expressing an in-plane retardation and a birefringence in the thickness direction of the film.

As the retardation developer in the invention, use can be preferably made of compounds disclosed in JP-A-2001-166144, JP-A-2002-363343, JP-A-2003-344655, JP-A-2000-275434 and so on.

<Ultraviolet Absorber>

In the first retardation cellulose acylate film of the invention, it is also possible to impart the function as a retardation developer to an ultraviolet (UV) absorber.

As the ultraviolet absorber preferably usable in the invention, for example, an oxybenzophenone based compound, a benzotriazole based compound, a salicylic acid ester based compound, a benzophenone based compound, a cyano acrylate based compound, and a nickel complex salt based compound can be enumerated. Among these compounds, a benzotriazole based compound which is less in coloration is preferable. Also, use can be preferably made of ultraviolet absorbers disclosed in JP-A-10-182621 and JP-A-8-337574 and a high molecular ultraviolet absorber disclosed in JP-A-6-148430. In the case where the cellulose acylate film of the invention is to be used as a protective film of a polarizing plate, it is preferable to use, as the ultraviolet absorber, one having an excellent ability for absorbing ultraviolet rays having a wavelength of not more than 370 nm from the viewpoint of preventing deterioration of a polarizer or a liquid crystal and having less absorption of visible light having a wavelength of 400 nm or more from the viewpoint of liquid crystal display properties.

Specific examples of the benzotriazole based ultraviolet absorber which is useful in the invention include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzo-triazole, 2-(2'-hydroxy-3'-(3",4",5",6"-tetrahydrophthalimidomethyl)-5'-methylphenyl)benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2H-benzotri-azol-2-yl)-6-(linear or side chain decyl)-4-methylphenol, and a mixture of octyl-3-[3-tert-butyl-4-hydroxy-5-chloro-2H-benzotriazol-2-yl)phenyl]propionate with 2-ethylhexyl-3-[3-tert-butyl-4-hydroxy-5-(5-chloro-2H-benzotriazol-2-yl)phenyl]propionate. However, it should not be construed that the invention is limited thereto. Also, commercially available products such as TINUVIN 109, TINUVIN 171 and TINUVIN 326 (all of which are manufactured by Ciba Speciality Chemicals) can be preferably used.

(Other Additives)

The first retardation cellulose acylate film and second retardation cellulose acylate film of the invention may contain a degradation preventing agent (for example, an antioxidant, a peroxide decomposing agent, a radical inhibitor, a metal inactivating agent, an acid scavenger, and an amine). The degradation preventing agent is disclosed in JP-A-3-199201, JP-A-5-197073, JP-A-5-194789, JP-A-5-271471, and JP-A-6-107854. The amount of addition of the degradation preventing agent is preferably from 0.01 to 1% by mass, more preferably from 0.01 to 0.2% by mass of the solution (dope) as prepared. When the addition amount is 0.01% by mass or more, it is preferable that the effect of the degradation preventing agent can be sufficiently achieved. When the addition amount is 1% by mass or less, it is preferable that bleed out (oozing) of the degradation preventing agent onto the film surface scarcely arises. Especially preferred examples of the degradation preventing agent include butylated hydroxytoluene (BHT) and tribenzylamine (TBA).

(Microparticles of Matting Agent)

It is preferable that the second retardation film of the invention contains microparticles as a matting agent. Examples of the microparticles which can be used in the invention include silicon dioxide (silica), titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Among these microparticles, those containing silicon are preferable because of having a turbidity, and silicon dioxide is especially preferable. The microparticles of silicon dioxide preferably have an average primary particle size of from 1 nm to 20 nm and an apparent specific gravity of 70 g/liter or more. Those having such a small average primary particle size as from 5 to 25 nm is more preferable because of capable of reducing the haze. The apparent specific gravity is preferably from 90 to 200 g/liter, and more preferably from 100 to 200 g/liter. A larger apparent specific gravity is the more preferable, since it enables the preparation of a dispersion having a high concentration, and contributes to the improvement in the haze and aggregation.

Such microparticles usually occur as aggregates of the primary particles and form secondary particles having an average particle of from 0.05 to 2.0 µm in the film, thereby forming peaks and valleys of from 0.05 to 2.0 µm on the film surface. The average secondary particle size is preferably from 0.05 µm to 1.0 µm, more preferably from 0.1 µm to 0.7 µm, and still more preferably from 0.1 µm to 0.4 µm. With respect to the primary or secondary particle size, particles in the film are observed under a scanning electron microscope, and a diameter of a circle which is circumscribed on the particle is defined as the particle size. Furthermore, 200 particles are observed by changing the site, and an average value thereof is defined as the average particle size.

As the microparticles of silicon dioxide, use can be made of commercially available products, for example, AEROSIL R972, AEROSIL R972V, AEROSIL R974, AEROSIL R812, AEROSIL 200, AEROSIL 200V, AEROSIL 300, AEROSIL R202, AEROSIL OX50, and AEROSIL TT600 (all of which are manufactured by Nippon Aerosil Co., Ltd.). As the microparticles of zirconium oxide, use can be made of commercially available products, for example, AEROSIL R976 and AEROSIL R811 (all of which are manufactured by Nippon Aerosil Co., Ltd.).

Among these products, AEROSIL 200V and AEROSIL R972V are especially preferable, since they are microparticles of silicon dioxide having an average primary particle size of not more than 20 nm and an apparent specific gravity of 70 g/liter or more and have an effect for decreasing a coefficient of friction while keeping the haze of an optical film at a low level.

Although the method of adding the matting agent is not particularly restricted in the invention, it is preferred to use an in-line mixer in mixing the matting agent dispersion with an additive solution, the cellulose acylate solution and so on. In mixing silicon dioxide microparticle with a solvent, etc. and dispersing the mixture, the concentration of silicon dioxide is preferably from 5 to 30% by mass, more preferably from 10 to 25% by mass, and still more preferably from 15 to 20% by mass. A higher dispersing concentration is the more preferable, since the turbidity at the same addition amount becomes lower and the haze and aggregation are improved thereby. The addition amount of the matting agent in the final cellulose acylate dope solution is preferably from 0.001 to 1.0% by mass, more preferably from 0.005 to 0.5% by mass, and still more preferably from 0.01 to 0.1% by mass.

[Stretching Treatment]

It is particularly preferable that at least one of the first retardation film and the second retardation film of the invention is a stretched film. A desired retardation can be imparted to the film by the stretching. A preferable direction of the stretching of the cellulose acylate film is the width direction (transverse stretching). By stretching in the width direction, a polarizing plate in which the transmission axis of the polarizer is parallel to the slow axis of the retardation film can be produced by the roll-to-roll process. By bonding the first retardation film and the second retardation film to the liquid crystal cell so that the absorption axes bisect each other at right angle, furthermore, a liquid crystal display device showing little change in tint depending on viewing angle can be obtained.

Methods for stretching in the width direction are described in, for example, JP-A-62-115035, JP-A-4-152125, JP-A-4-284211, JP-A-4-298310, JP-A-11-48271, etc.

The film is stretched at ordinary temperature or under heating. The film may be stretched during the drying, and can be efficiently stretched particularly in a case where a solvent remains in the film. In the case of stretching the film in the width direction, the film may be stretched in such a manner that the film is transported with the ends held by a tenter, while gradually increasing the width of the tenter. After drying, the film may be stretched by a stretching apparatus (preferably by uniaxial stretching using a long stretching apparatus).

The film stretch ratio (the ratio based on the unstretched film) is preferably 1% to 200%, more preferably 5% to 150%.

The first retardation film and second retardation film of the invention can be preferably produced by using a method involving the shrinking step.

In the method involving the steps of stretching the film in the width direction and shrinking the film in the transport direction, the film can be shrunk in such a manner that the film is held by a pantograph- or linear motor-type tenter, and a distance between clips is gradually reduced in the transport direction while stretching the film in the width direction.

As a stretching apparatus for stretching the film in either the longitudinal direction or the width direction and shrinking the film in the other direction simultaneously to increase the film thickness, use can be made of, for example, FITZ manufactured by Ichikin, Ltd. This apparatus is described in JP-A-2001-38802.

The stretch ratio in the stretching step and the shrink ratio in the shrinking step may be appropriately selected depending on the desired front retardation Re and the retardation in thickness direction Rth. It is preferred that the stretch ratio in the stretching step is 10% or more and the shrink ratio is in the shrinking step is 5% or more.

The term "shrinking ratio" as used in the invention means the length ratio of the film in the shrinking direction before and after the shrinking step.

The shrink ratio is preferably 5 to 40%, particularly preferably 10 to 30%.

[Thicknesses of First Retardation Film and Second Retardation Film]

The thicknesses of the first retardation film and second retardation film of the invention are preferably 10 to 200 μm, more preferably 20 to 150 μm, and most preferably 30 to 100 μm.

[Saponification Treatment]

The first retardation film and second retardation film of the invention may be subjected to an alkali saponification treatment. Owing to the alkali saponification treatment, the adhesiveness to a polarizer material such as a polyvinyl alcohol can be imparted, which makes these films preferably usable as protective films for the polarizing plate.

It is preferable in the invention that the alkali saponification treatment of the cellulose acylate films is carried out in the cycle comprising dipping a film surface in an alkali solution, neutralizing with an acidic solution, washing with water, and then drying. As the above-described alkali solution, use may be made of a potassium hydroxide solution or a sodium hydroxide solution, and the hydroxide ion concentration thereof preferably ranges from 0.1 to 5.0 mol/L, more preferably from 0.5 to 4.0 mol/L. The temperature of the alkali solution is preferably within a range of room temperature to 90° C., more preferably within a range of 40 to 70° C.

[Polarizing Plate]

A polarizing plate comprises a polarizer and two sheets of transparent protective films provided in both sides thereof. The first retardation film and second retardation film of the invention can be used as one of the protective films. As the other protective film, a commonly employed cellulose acetate film may be used. The polarizer includes an iodine-containing polarizer, a dye-containing polarizer using a dichroic dye, and a polyene-based polarizer. The iodine-containing polarizer and the dye-containing polarizer are produced generally by using a polyvinyl alcohol-based film. In the case of using the cellulose acylate film of the invention as a protective film for the polarizing plate, the method for fabricating the polarizing plate is not particularly limited, and the polarizing plate may be fabricated by a commonly employed method. There is a method which comprises treating the resultant cellulose acylate film with an alkali and bonding the film to both sides of a polarizer, which has been fabricated by dipping a polyvinyl alcohol film in an iodine solution and stretching, with the use of an aqueous solution of a completely saponified polyvinyl alcohol. As a substitute for the alkali treatment, a simplified adhesive processing as disclosed in JP-A-6-94915 and JP-A-6-118232 may be conducted. Examples of the adhesive to be used in bonding the treated surface of the protective film to the polarizer include polyvinyl alcohol-based adhesives such as polyvinyl alcohol or polyvinyl butyral and vinyl-based latexes such as a butyl acrylate. The polarizing plate is constituted by a polarizer and protective films protecting both surfaces of the polarizer, and may be constituted by further laminating a protective film to one surface of the polarizing plate and a separate film to the opposite surface thereof. The protective film and the separate film are used for protecting the polarizing plate, for example, at the shipment of the polarizing plate or at the inspection of product. In this case, the protective film is bonded for the purpose of protecting the polarizing plate surface and used on the side opposite to the surface through which the polarizing plate is attached to a liquid crystal plate. The separate film is used for the purpose of covering the adhesive layer to be bonded to a liquid crystal plate and used on the side of the surface through which the polarizing plate is attached to the liquid crystal plate.

It is preferable that the cellulose acylate film of the invention is bonded to a polarizer so that the transmission axis of the polarizer is substantially parallel to the slow axis of the cellulose acylate film of the invention.

In the liquid crystal display device of the invention, it is preferable that the transmission axis of the first polarizing plate is substantially parallel to the slow axis of the first retardation film and the transmission axis of the second polarizing plate is substantially parallel to the slow axis of the second retardation film. The term "substantially parallel" is used herein to mean that the misalignment between the direction of the main refractive index nx of the first retardation film or the second retardation film to be used in the invention and the transmission axis of the polarizing plate is not larger than 5°, more preferably not larger than 1° and still more preferably not larger than 0.5°. It is undesirable that the misalignment exceed 1°, since the polarization performance in the polarizing plate cross-Nicol state decreases and thus light leakage arises in this case.

In the invention, the single plate transmittance (TT), parallel transmittance (PT) and cross transmittance (CT) of the polarizing plate are measured by using UV3100PC (manufactured by Shimadzu Corporation). The measurement is carried out within the range from 380 to 780 nm, and an average of 10 measurements is used for each of the single plate transmittance, parallel transmittance and cross transmittance. The endurance test of the polarizing plate is performed in two modes, that is, (1) a polarizing plate alone and (2) a polarizing plate attached to a glass via a pressure-sensitive adhesive. In the measurement of a polarizing plate alone, two polarizers are combined by inserting an optical compensatory sheet between them and two samples having the same crossing are prepared. For the glass-bonded mode, the polarizing plate is bonded to a glass so that the optical compensatory film comes to the glass side, and two samples (about 5 cm×5 cm) are prepared. The single plate transmittance is measured by directing the film side of the sample toward the light source. Two samples are measured and the average of the obtained values is employed as the single plate transmittance. The polarizing performance is preferably as follows, in the order of single plate transmittance TT, parallel transmittance PT and cross transmittance CT: $40.0 \leq TT \leq 45.0$, $30.0 \leq PT \leq 40.0$ and $CT \leq 2.0$, more preferably $41.0 \leq TT \leq 44.5$, $34 \leq PT \leq 39.0$ and $CT \leq 1.3$ (each represented in %). In the endurance test of the polarizing plate, a smaller change is the more preferred.

In the polarizing plate of the invention, when the polarizing plate is left standing at 60° C. and 95% RH for 500 hours, the variation ΔCT (%) of single plate cross transmittance and the variation ΔP of polarization degree preferably satisfy at least one or more of the following formulae (j) and (k):

$-6.0 \leq \Delta CT \leq 6.0$      Formula (j)

$-10.0 \leq \Delta P \leq 0.0$      Formula (k)

wherein the variation means a value obtained by subtracting the measured value before test from the measured value after test.

By satisfying the above requirement, a high stability of the polarizing plate can be assured during using or storing.

<Functionalization of Polarizing Plate>

It is preferable to use the polarizing plate of the invention in the state of a functionalized polarizing plate completed with an antireflection film for improving the visibility of a display, a brightness improving film, or an optical film having a functional layer such as a hard coat layer, a forward scattering layer, an antiglare layer and so on.

(Antireflection Film)

The polarizing plate of the invention can be used in combination with an antireflection film. As the anti-reflection film, any of a film having a reflectance of about 1.5%, in which only a single layer made of a low refractive index raw material such as a fluorine based polymer is imparted or a film having a reflectance of not more than 1% utilizing multilayered interference of a thin film can be used. In the invention, a construction comprising a transparent support having laminated thereon a low refractive index layer and at least one layer having a refractive index higher than the low refractive index layer (namely, a high refractive index layer and a middle refractive index layer) is preferably used. Antireflection films disclosed in Nitto Giho, Vol. 38, No. 1, May 2000, pages 26 to 28 and JP-A-2002-301783 can also be preferably used.

The refractive index of each of the layers satisfies the following relation.

(Refractive index of high refractive index layer)>(Refractive index of middle refractive index layer)>(Refractive index of transparent support)>(Refractive index of low refractive index layer)

As the transparent support to be used in the antireflection film, use can be preferably made of a transparent polymer film which is used in the protective film of the polarizer disclosed above.

The refractive index of the low refractive index layer is preferably from 1.20 to 1.55, more preferably from 1.30 to 1.50. It is preferable to use the low refractive index layer as the outermost layer having scratch resistance and antifouling properties. For the purpose of improving the scratch resistance, it is preferable to impart slipperiness to the surface by using a starting material such as a silicone compound having silicone group or a fluorine-containing compound.

As the fluorine-containing compound disclosed above, use can be preferably made of, for example, compounds as disclosed in JP-A-9-222503, paragraphs [0018] to [0026]; JP-A-11-38202, paragraphs [0019] to [0030]; JP-A-2001-40284, paragraphs [0027] to [0028]; and JP-A-2000-284102.

The silicone-containing compound disclosed above is preferably a compound having a polysiloxane structure, and useful examples thereof include reactive silicones (for example, SILAPLANE (manufactured by Chisso Corporation) and polysiloxanes containing silanol groups on the both terminals thereof (JP-A-11-258403). An organometallic compound such as silane coupling agents and a silane coupling agent containing a specific fluorine-containing hydrocarbon group may be cured through a condensation reaction in the presence of a catalyst (for example, compounds that are disclosed in JP-A-58-142958, JP-A-58-147483, JP-A-58-147484, JP-A-9-157582, JP-A-11-106704, JP-A-2000-117902, JP-A-2001-48590, and JP-A-2002-53804).

The low refractive index layer can preferably contain, as additives other than the above-described compounds, a filler (for example, a low refractive index inorganic compound having an average primary particle size of from 1 to 150 nm such as silicon dioxide (silica) and fluorine-containing particles (for example, magnesium fluoride, potassium fluoride, and barium fluoride), and organic microparticles disclosed in JP-A-11-3820, paragraphs [0020] to [0038]), a silane coupling agent, a lubricant, a surfactant, and the like.

Although the low refractive index layer may be formed by a vapor phase method (for example, the vacuum vapor deposition method, the sputtering method, the ion plating method or the plasma CVD method), it is preferable from the standpoint of inexpensive production costs that the low refractive index layer is formed by a coating method. As the coating method, the dip coating method, the air knife coating method, the curtain coating method, the roller coating method, the wire bar coating method, the gravure coating method, and the micro gravure method may be preferably employed.

The film thickness of the low refractive index layer is preferably from 30 to 200 nm, more preferably from 50 to 150 nm, and most preferably from 60 to 120 nm.

It is preferable that the middle refractive index layer and the high refractive index layer are each constructed by dispersing ultra microparticles of a high refractive index inorganic compound having an average particle size of not more than 100 nm in a matrix material. As the ultra microparticles of the high refractive index inorganic compound, use can be preferably made of an inorganic compound having a refractive index of 1.65 or more, such as oxides of Ti, Zn, Sb, Sn, Zr, Ce, Ta, La, In, etc. and composite oxides containing such a metal atom.

These ultra microparticles can be used in a mode of, for example, treating the particle surface with a surface treating agent (for example, a silane coupling agent or the like as disclosed in JP-A-11-295503, JP-A-11-153703, and JP-A-2000-9908; and an anionic compound or an organometallic coupling agent as disclosed in JP-A-2001-310432), taking a core-shell structure using the high refractive index particle as a core (as disclosed in JP-A-2000-166104), or jointly using a specific dispersant (as disclosed in, for example, JP-A-11-153703, U.S. Pat. No. 6,210,858B1 and JP-A-2002-2776069).

As the matrix material disclosed above, conventionally known thermoplastic resins and curable resin films and the like can be used. It is also possible to use polyfunctional materials that are disclosed in JP-A-2000-47004, JP-A-2001-315242, JP-A-2001-31871, JP-A-2001-296401, etc., and curable films obtained from a metal alkoxide composition that are described in JP-A-2001-293818, etc.

The refractive index of the high refractive index layer is preferably from 1.70 to 2.20. The thickness of the high refractive index layer is preferably from 5 nm to 10 µm, and more preferably from 10 nm to 1 µm.

The refractive index of the middle refractive index is adjusted such that it becomes an intermediate value between the refractive index of the low refractive index layer and the refractive index of the high refractive index layer. The refractive index of the middle refractive index is preferably from 1.50 to 1.70.

The haze of the antireflection film is preferably not more than 5%, more preferably not more 3%. Furthermore, the strength of the film is preferably H or more, more preferably 2H or more, and most preferably 3H or more in the pencil hardness test according to JIS K5400.

(Brightness Improving Film)

The polarizing plate of the invention can be used in combination with a brightness improving film. The brightness improving film, which has a function of separating circularly polarized light or linearly polarized light, is provided between the polarizing plate and the backlight and backwardly reflects or backwardly scatters the one-sided circularly polarized light or linearly polarized light. When the light having been reflected again from the backlight part partially changes the polarization state and comes again into the brightness improving film and the polarizing plate, it is partially transmitted. By repeating this process, therefore, the rate of using light is improved, and the front brightness is improved by about 1.4 times. As the brightness improving film, there are known an anisotropic reflection system and an anisotropic scattering system, and both of them can be combined with the polarizing plate of the invention.

In the anisotropic reflection system, there is known a brightness improving film in which a uniaxially stretched film and an unstretched film are laminated in multiple layers to enlarge the difference in the refractive index in the stretching direction thereby establishing anisotropy of the reflectance and transmittance. There are known a multilayered film system using the principle of a dielectric mirror (disclosed in WO 95/17691, WO 95/17692 and WO 95/17699) and a cholesteric liquid crystal system (disclosed in European Patent No. 606,940A2 and JP-A-8-271731). In the invention, it is preferable to use DBEF-E, DBEF-D and DBEF-M (all of which are manufactured by 3M) as the brightness improving film of a multilayered system using the principle of a dielectric mirror, and NIPOCS (manufactured by Nitto Denko Corporation) as the brightness improving film of a cholesteric liquid crystal system. With respect to NIPOCS, reference can be made to *Nitto Giho*, Vol. 38, No. 1, May 2000, pages 19 to 21 and the like.

Furthermore, it is preferred to use the polarizing plate of the invention in combination with a brightness improving film of an anisotropic scattering system obtained by blending a positive intrinsic birefringent polymer and a negative intrinsic birefringent polymer and uniaxially stretching the blend as disclosed in WO 97/32223, WO 97/32224, WO 97/32225, WO 97/32226, JP-A-9-274108, and JP-A-11-174231. As the brightness improving film of an anisotropic scattering system, DRPF-H (manufactured by 3M) is preferable.

(Other Functional Optical Film)

It is also preferable that the polarizing plate of the invention is used in additional combination with a functional optical film provided with a hard coat layer, a forward scattering layer, an antiglare layer, a gas barrier layer, a lubricating layer, an antistatic layer, an undercoating layer, a protective layer, etc. Furthermore, it is also preferred to use such a functional layer mutually compounded with the antireflection layer in the above-described antireflection film or the optically anisotropic layer or the like within the same layer. Such a functional layer can be provided on either one surface or the both surfaces of the polarizer side and the opposite surface to the polarizer (the surface closer to the air side) and used.

[Hard Coat Layer]

In order to impart a dynamic strength such as scratch resistance, it is preferable that the polarizing plate of the invention is combined with a functional optical film having a hard coat layer provided on the surface of the transparent support. When the hard coat layer is applied to the above-described antireflection film and used, it is especially preferred to provide the hard coat layer between the transparent support and the high refractive index layer.

It is preferable that the above-described hard coat layer is formed by a crosslinking reaction of a compound curable by light and/or heat or a polymerization reaction. Preferable examples of a constructional composition of the hard coat layer include ones described in, for example, JP-A-2002-144913, JP-A-2000-9908, and WO 00/46617.

The film thickness of the hard coat layer is preferably from 0.2 to 100 µm.

The strength of the hard coat layer is preferably H or more, more preferably 2H or more, and most preferably 3H or more in a pencil hardness test according to JIS K5400. Furthermore, it is preferable that the amount of abrasion of a specimen before and after the test in the Taber test according to JIS K5400 is small as far as possible.

As a material for forming the hard coat layer, use can be made of an ethylenically unsaturated group-containing compound and a ring opening polymerizable group-containing compound. These compounds can be used either alone or in combination. Preferred examples of the ethylenically unsaturated group-containing compound include polyacrylates of polyol, for example, ethylene glycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate; epoxy acrylates, for example, diacrylate of bisphenol A diglycidyl ether and diacrylate of hexanediol diglycidyl ether; and urethane acrylates obtained by a reaction of a polyisocyanate with a hydroxyl group-containing acrylate such as hydroxyethyl acrylate. Furthermore, EB-600, EB-40, EB-140, EB-1150, EB-1290K, IRR214, EB-2220, TMPTA, and TMPTMA (all of which are manufactured by Daicel-UCB Company, Ltd.); UV-6300 and UV-1700B (all of which are manufactured by Nippon Synthetic Chemical Industry Co., Ltd.); and the like are enumerated as commercially available products.

Furthermore, preferred examples of the ring opening polymerizable group-containing compound include glycidyl ethers, for example, ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl cyanurate, sorbitol tetraglycidyl ether, pentaerythritol tetraglycidyl ether, polyglycidyl ether of a cresol novolak resin, and polyglycidyl ether of a phenol novolak resin; alicyclic epoxys, for example, CELLOXIDE 2021P, CELLOXIDE 2081, EPOLEAD GT-301, EPOLEAD GT-401, and EHPE3150CE (all of which are manufactured by Daicel Chemical Industries, Ltd.), and polycyclohexyl epoxy methyl ether of a phenol novolak resin; and oxetanes, for example, OXT-121, OXT-221, OX-SQ, and PNOX-1009 (all of which are manufactured by Toagosei Co., Ltd.). In addition, polymers of glycidyl (meth)acrylate or copolymers of glycidyl (meth)acrylate and a copolymerizable monomer can be used in the hard coat layer.

For the purpose of lowering hardening and shrinkage of the hard coat layer, improving the adhesion thereof to a base material, and reducing curling of a hard coat-treated article in the invention, it is preferable to add to the hard coat layer microparticle of oxide of silicon, titanium, zirconium, aluminum, etc., crosslinked microparticles of, for example, polyethylene, polystyrene, a poly(meth)acrylic acid ester, polydimethylsiloxane, etc. or crosslinked rubber microparticles of SBR, NBR, etc. The average particle size of such crosslinked microparticles is preferably from 1 nm to 20,000 nm. These crosslinked microparticles are not particularly limited in shape, and examples of the shape include spherical, rod-like, acicular, and tabular shapes. The amount of addition of the microparticles is preferably not more than 60% by volume, more preferably not more than 40% by volume of the hard coat layer after hardening.

In the case of adding the above-described inorganic microparticles, since the inorganic microparticles are generally poor in compatibility with a binder polymer, it is preferable that the inorganic microparticles are subjected to a surface treatment with a surface treating agent containing a metal such as silicon, aluminum, or titanium and having a functional group such as an alkoxide group, a carboxyl group, a sulfonic acid group or a phosphonic acid group.

It is preferable that the hard coat layer is hardened by using heat or active energy rays. Among all, it is more preferred to use active energy rays such as radiations, gamma rays, alpha rays, electron beams or ultraviolet rays. Taking into account the stability and productivity, it is especially preferred to use electron beams or ultraviolet rays. In the case of thermal hardening, the heating temperature is preferably not higher than 140° C. and more preferably not higher than 100° C., taking into account the heat resistance of the plastic per se.

[Forward Scattering Layer]

The forward scattering layer is used for improving the viewing angle characteristic in the up and down and right and left directions (hue and brightness distribution) in the case of applying the polarizing plate of the invention to a liquid crystal display device. In the invention, it is preferable to employ a forward scattering layer having a construction in which microparticles having a different refractive index are dispersed in a binder. For example, use can be made of a construction in which a coefficient of forward scattering is specified as disclosed in JP-A11-38208; a construction in which a relative refractive index between a transparent resin and a microparticle is made to fall within a specified range as disclosed in JP-A-2000-199809; and a construction in which the haze value is specified at 40% or more as disclosed in JP-A-2002-107512 can be employed. To control the viewing angle characteristic of haze, it is also preferable to use a combination of the polarizing plate of the invention with "LUMISTRY" that is disclosed in pages 31 to 39 of Technical Report *Photo-functional Films* of Sumitomo Chemical Co., Ltd.

[Antiglare Layer]

The antiglare layer is used for scattering reflected light to prevent the formation of reflected images caused by refection of external light. An antiglare function is achieved by forming peaks and valleys on the outermost surface (display side) of the liquid crystal display device. The haze of an optical film having an antiglare function is preferably from 3 to 30%, more preferably from 5 to 20%, and most preferably from 7 to 20%.

As a method for forming peaks and valleys on the film surface, use can be preferably made of, for example, a method of adding microparticles to form peaks and valleys on the film surface (see, for example, JP-A-2000-271878); a method of adding a small amount (from 0.1 to 50% by mass) of relatively large particles (particle size: 0.05 to 2 μm) to form a film having peaks and valleys on the surface (see, for example, JP-A-2000-281410, JP-A-2000-95893, JP-A-2001-100004, and JP-A-2001-281407); a method of mechanically transferring a shape having peaks and valleys onto the film surface (for example, an embossing method disclosed in JP-A-63-278839, JP-A-11-183710, and JP-A-2000-275401); and the like.

<Constitution of Liquid Crystal Display Device>

Next, the constitution of a liquid crystal display device preferably usable in the invention will be described.

FIG. 1 is a schematic diagram showing an example of the liquid crystal display device of the invention. In FIG. 1, the liquid crystal display device 10 includes a liquid crystal layer 7, a liquid crystal cell having an upper electrode substrate of liquid crystal cell 5 and a lower electrode substrate of liquid crystal cell 8 provided on and under the liquid crystal layer 7 respectively, and a first polarizing plate 12 and a second polarizing plate 1 provided on both sides of the liquid crystal cell. A color filter may be provided between the liquid crystal cell and each polarizing plate. In the case of using the above liquid crystal display device 10 as a transmission-type liquid crystal display device, a backlight using a cold or hot cathode fluorescent tube or using a light-emitting diode, a field emission element or an electroluminescent element as the light source may be provided on the back plane (below the first polarizing plate 12). In FIG. 1, the reference numerals 2 and 13 respectively indicate the absorption axis directions of the second polarizing plate and the first polarizing plate, while the reference numerals 6 and 9 respectively indicate the orientation-regulating directions of the upper and lower substrates.

The first polarizing plate 12 and the second polarizing plate 1 have each a constitution in which two protective films are laminated so as to sandwich a polarizer between them. The protective film laminated in the liquid crystal cell side of the first polarizing plate is the first retardation film of the invention, while the protective film laminated in the liquid crystal cell side of the second polarizing plate is the second retardation film of the invention. When the maximal linear thermal expansion coefficient of the first retardation film is referred to as EC1max while the maximal linear thermal expansion coefficient of the second retardation film is referred to as EC2max, EC1max and EC2max satisfy the requirement represented by the formula (1) as described above.

As discussed above, it is preferable that the liquid crystal display device 10 of the invention comprises a transparent protective film, the polarizer and the cellulose acylate film (retardation film) of the invention that are laminated in this order from the external side (the side more distant from the liquid crystal cell) of the device. The liquid crystal display device 10 includes any of image direct view type, image projection type and light modulation type liquid crystal display devices. An active matrix liquid crystal display device in which 3- or 2-terminal semiconductor devices such as TFT and MIM are used is effective in the invention. As a matter of course, a passive matrix liquid crystal display device typified by STN type which is driven by so-called time-division driving is also effective.

(VA Mode)

In the present invention, preferable is a VA-mode liquid crystal cell.

In the VA mode, between upper and lower substrates, a liquid crystal having negative dielectric anisotropy, $\Delta n=0.0813$ and $\Delta\epsilon$=about $-4.6$ is interposed and aligned by rubbing to a director (showing the alignment direction of liquid crystal molecules), that is, so-called tilt angle with respect to the substrate plane, of about 89°. The thickness d of the liquid crystal layer 7 in FIG. 1 is 3.5 μm. The brightness at the white display varies depending on the product $\Delta nd$ of the thickness d and the refractive index anisotropy $\Delta n$. To obtain the maximum brightness, therefore, the thickness of the liquid crystal layer is set to 0.2 μm to 0.5 μm.

The absorption axis 2 of the second polarizing plate 1 of the liquid crystal cell runs at nearly right angle with the absorption axis 13 of the first polarizing plate 12. In the inner side of each orientation film of the upper electrode substrate 5 and the lower electrode substrate 8 on the liquid crystal cell, a transparent electrode (not shown) is formed. In the non-driving state where a driving voltage is not applied to the electrode, the liquid crystal molecules of the liquid crystal layer 7 are aligned nearly perpendicularly to the substrate plane and, as a result, the polarization state of light transmitted through the liquid crystal panel is scarcely changed. That is, an ideal black display can be realized in the non-driving state of the liquid crystal display device. On the other hand, in the driving state, liquid crystal molecules are inclined nearly in parallel to the electrode substrate plane and the light passed through the liquid crystal panel is changed in the polarization state by the inclined liquid crystal molecules. In other words, a white display is obtained in the driving state of the liquid crystal display device.

In this embodiment, since an electric field is applied between upper and lower substrates, a liquid crystal material having negative dielectric anisotropy such that liquid crystal molecules respond perpendicularly to the electric field direction is used. In the case where an electrode is provided on one electrode substrate and the electric field is applied in the transversal direction parallel to the substrate plane, a liquid crystal material having positive dielectric anisotropy is used.

In VA-mode liquid crystal display devices, a chiral material generally used in TN-mode liquid crystal display devices is scarcely added because of the risk of deteriorating the dynamic response properties. However, this material is sometimes added to reduce the alignment failure.

The characteristic features of the VA mode are high response and high contrast. However, the contrast deteriorates in the oblique direction despite high contrast at the front. The liquid crystal molecules at the black display are aligned perpendicularly to the substrate plane and when observed from the front, a high contrast is obtained because of almost no birefringence in the liquid crystal molecules and in turn, low transmittance. When observed from the oblique direction, however, birefringence is caused in the liquid crystal molecules. Furthermore, although the crossing angle between absorption axes of upper and lower polarizing plates is orthogonal of 90° at the front, this angle exceeds 90° when viewed from the oblique direction. Because of these two factors, light leakage occurs in the oblique direction and thus the contrast decreases. In order to solve this problem, optically compensatory sheets are provided.

Also, although the liquid crystal molecules are inclined at the white display time, the birefringence of liquid crystal molecules when observed from the oblique direction greatly differs between the inclination direction and the opposite direction and a difference is caused in the brightness or color tone. For solving this problem, the liquid crystal display device is constituted to have a structure called multi-domain of dividing one pixel into multiple regions.

[Multi-Domain]

In the VA-mode, for example, under application of electric field, liquid crystal molecules are inclined in pixels which respectively comprise a plurality of different domains. Thus, it becomes possible to average the viewing angle property. Division of the orientation within a single pixel can be achieved by forming a slit or a projection on the electrode to thereby alter the electric filed direction or bias the electric field density. An increase in the number of division may successfully result in omnidirectional uniformity in the viewing angle, where four-division or eight-division or more will be sufficient for achieving an almost uniform viewing angle. In particular, eight-division is preferable because the absorption angle of the polarizer plate can be set to an arbitrary angle.

The liquid crystal molecules may have a lower response in the domain boundary of the divisional orientation, which results in a problem of lowering the brightness in the normally-black display in which black display must be maintained. Addition of a chiral agent to the liquid crystal material will be successful in minimizing the domain boundary.

EXAMPLES

Next, the present invention will be described in greater detail by reference to the following Examples. The materials, amounts, proportions, treatments, procedures and so on employed in the following Examples can be optionally changed without departing from the scope of the invention. That is, it is to be understood that the scope of the invention is not restricted to the following matters.

Referential Example 1

Production of Retardation Film A

The following cellulose acylate solution A composition was charged into a mixing tank, and the respective components were dissolved with stirring to prepare a cellulose acylate solution A.

Composition of Cellulose Acylate Solution A

| | |
|---|---|
| Cellulose acylate having degree of butyrylation of 1.66 and degree of acetylation of 1.00 | 100% by weight |
| Triphenyl phosphate (plasticizer) | 2% by weight |
| Biphenyl diphenyl phosphate (plasticizer) | 1% by weight |
| Methylene chloride (first solvent) | 300% by weight |
| Methanol (second solvent) | 54% by weight |
| 1-Butanol | 11% by weight |
| Retardation developer A (see below) | 4% by weight |

Retardation developer A:

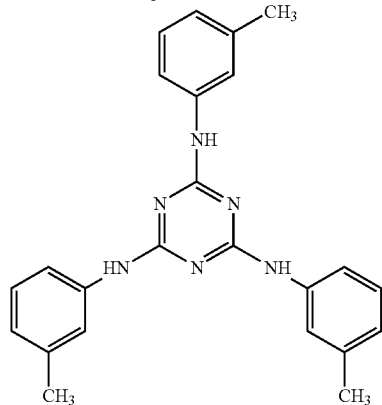

(Production of Retardation Film A)

The cellulose acylate solution A was cast using a band casting machine. The obtained web was stripped off from the band and laterally stretched at a stretching ratio of 30% at a temperature of 120° C. by using a tenter. Thereafter, a clip was taken off and the resulting film was dried at 110° C. for 40 minutes to produce a retardation film A. The stretched cellulose acylate film thus obtained had a residual solvent content of 0.2% by mass, a film thickness of 73 µm, Re(548) of 48 nm and Rth(548) of 122 nm.

Referential Example 2

Production of Retardation Film B

The following composition was charged into a mixing tank, and the respective components were dissolved with stirring to prepare a cellulose acylate solution B.

Composition of Cellulose Acylate Solution B

| | |
|---|---|
| Cellulose acylate having degree of acetylation of 1.9 and degree of propionylation of 0.8 | 100.0 parts by mass |
| Triphenyl phosphate (plasticizer) | 9.0 parts by mass |
| Ethyl phthalyl phosphate (plasticizer) | 3.5 parts by mass |
| Ultraviolet absorber (A) (see below) | 1.0 part by mass |
| Ultraviolet absorber (B) (see below) | 1.0 part by mass |
| Methylene chloride (first solvent) | 362.0 parts by mass |
| Ethanol (second solvent) | 100.0 parts by mass |

Ultraviolet absorber (A):

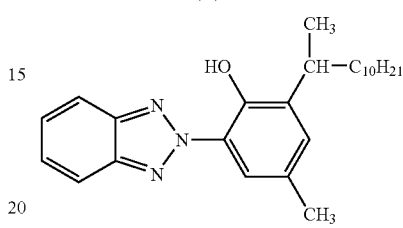

Ultraviolet absorber (B):

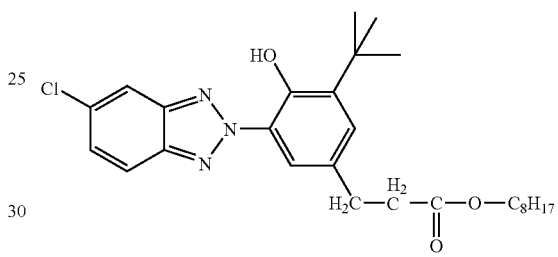

(Production of Retardation Film B)

The above-described cellulose acylate solution B was cast using a band casting machine. When the residual solvent content attained 31%, the film was stripped off from the band and laterally stretched at a stretching ratio of 50% in an atmosphere at a temperature of 150° C. by using a tenter. The obtained film had a film thickness of µm, Re(548) of 47 nm and Rth(548) of 124 nm.

Referential Example 3

Production of Retardation Film C

The following composition was charged into a mixing tank, and the respective components were dissolved with stirring to prepare a cellulose acylate solution C.

Composition of Cellulose Acylate Solution C

| | |
|---|---|
| Cellulose acylate having degree of acetylation of 1.6 and degree of propionylation of 0.8 | 100.0 parts by mass |
| Additive B (see below) | 5.0 parts by mass |
| Additive C (see below) | 2.9 parts by mass |
| Additive D (see below) | 1.5 parts by mass |
| Ultraviolet absorber (A) | 1.0 part by mass |
| Ultraviolet absorber (B) | 1.0 part by mass |
| Methylene chloride (first solvent) | 362.0 parts by mass |
| Ethanol (second solvent) | 100.0 parts by mass |

Additive B:

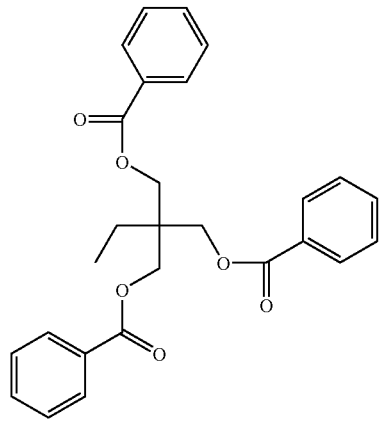

Additive C:

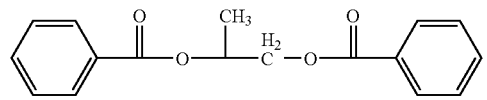

Additive D:

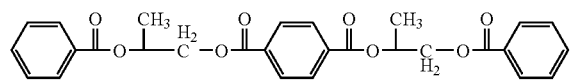

(Production of Retardation Film C)

The above-described cellulose acylate solution C was cast using a band casting machine. When the residual solvent content attained 40%, the film was stripped off from the band and laterally stretched at a stretching ratio of 40% in an atmosphere at a temperature of 150° C. by using a tenter. The obtained film had a film thickness of 43 μm, Re(548) of 43 nm and Rth(548) of 115 nm.

Referential Example 4

Production of Retardation Film D (Preparation of Cellulose Acylate Solution 21)

The following composition was charged into a mixing tank, and the respective components were dissolved with stirring to prepare a cellulose acylate solution 21.

Composition of Cellulose Acylate Solution 21

| | |
|---|---|
| Cellulose acylate having degree of acetylation of 2.93 and degree of polymerization of 390 | 100.0 parts by mass |
| Triphenyl phosphate (plasticizer) | 4.0 parts by mass |
| Biphenyl phosphate (plasticizer) | 2.0 parts by mass |
| Methylene chloride (first solvent) | 402.0 parts by mass |
| Ethanol (second solvent) | 60.0 parts by mass |

(Preparation of Matting Agent Solution 22)

The following composition was charged into a mixing tank, and the respective components were dissolved with stirring to prepare a matting agent solution 22.

Composition of Matting Agent Solution 22

| | |
|---|---|
| Silica particle having an average particle size of 20 nm (AEROSIL R972, manufactured by Nippon Aerosil Co., Ltd.) | 2.0 parts by mass |
| Methylene chloride (first solvent) | 76.3 parts by mass |
| Methanol (second solvent) | 11.4 parts by mass |
| Cellulose acylate solution 21 | 10.3 parts by mass |

(Preparation of Retardation Developer Solution 23)

The following composition was charged into a mixing tank, and the respective components were dissolved with stirring under heating to prepare a retardation developer solution 23.

Composition of Retardation Developer Solution 23

| | |
|---|---|
| Retardation developer B (see below) | 11.0 parts by mass |
| Retardation developer C (see below) | 9.0 parts by mass |
| Methylene chloride (first solvent) | 61.7 parts by mass |
| Methanol (second solvent) | 5.5 parts by mass |
| Cellulose acylate solution 21 | 12.8 parts by mass |

Retardation developer B:

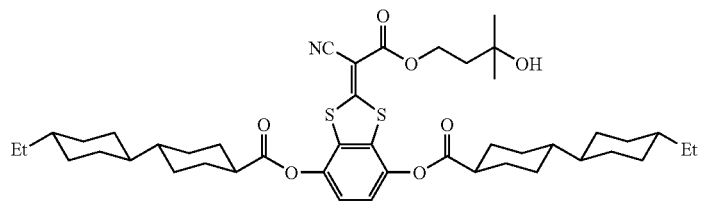

Retardation developer C:

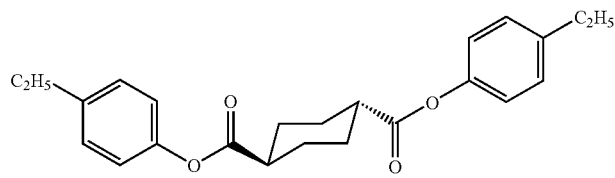

(Production of Retardation Film D)

90.6 parts by mass of the cellulose acylate solution 21 as described above and 8.1 parts by mass of the retardation developer solution 23 were separately filtered and then mixed together by using an in-line mixer. Further, 1.3 parts by mass of the matting agent solution 22 as described above was added and mixed by using an in-line mixer. The obtained mixture was cast using a band casting machine. After drying at 120° C. until the residual solvent content attained 50%, the film was stripped off and then laterally stretched at a stretching ratio of 15% in an atmosphere at a temperature of 150° C. by using a tenter. Then it was held at 150° C. for 30 seconds. At the point of starting the stretching, the residual solvent content was 25%. Next, the clip was taken off and the film was dried at 130° C. for 20 minutes to give a retardation film D. The obtained film had a film thickness of 55 μm, Re(548) of 100 nm and Rth(548) of 122 nm.

Referential Example 5

Production of Retardation Film E (Preparation of Cellulose Acylate Stock Solution (CAL-1))

The following composition was charged into a mixing tank, and the respective components were dissolved with stirring to prepare a cellulose acylate stock solution (CAL-1).
Composition of Cellulose Acylate Stock Solution (CAL-1)

| | |
|---|---|
| Cellulose acylate having degree of acetylation of 2.83 | 100.0 parts by mass |
| Triphenyl phosphate (plasticizer) | 7.0 parts by mass |
| Biphenyl phosphate (plasticizer) | 3.5 parts by mass |
| Methylene chloride (first solvent) | 425.0 parts by mass |
| Methanol (second solvent) | 37.0 parts by mass |

(Preparation of Matting Agent Solution (Ma-1))

The following composition was charged into a dispersion machine, and the respective components were dissolved with stirring to prepare a matting agent solution (Ma-1).
Composition of Matting Agent Solution (Ma-1)

| | |
|---|---|
| Silica particle having an average particle size of 20 nm (AEROSIL R972, manufactured by Nippon Aerosil Co., Ltd.) | 2.0 parts by mass |
| Methylene chloride (first solvent) | 80.6 parts by mass |
| Methanol (second solvent) | 7.0 parts by mass |
| cellulose acylate stock solution (CAL-1) | 10.3 parts by mass |

(Preparation of Retardation Developer Solution (Re-1))

The following composition was charged into a mixing tank, and the respective components were dissolved with stirring under heating to prepare a retardation developer solution (Re-1).
Composition of Retardation Developer Solution (Re-1)

| | |
|---|---|
| Retardation developer D (see below) | 20.0 parts by mass |
| Methylene chloride (first solvent) | 61.7 parts by mass |
| Methanol (second solvent) | 5.4 parts by mass |
| cellulose acylate stock solution (CAL-1) | 12.8 parts by mass |

Retardation developer D:

-continued

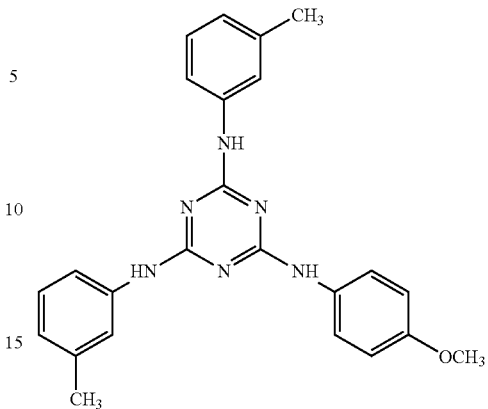

(Production of Retardation Film E)

93.7 parts by mass of the cellulose acylate stock solution (CAL-1) as described above, 1.3 parts by mass of the matting agent solution (Ma-1) and 5.0 parts by mass of the retardation developer solution (Re-1) were separately filtered and then mixed together. The obtained mixture was cast using a band casting machine. When the residual solvent content attained 75% by mass, the obtained film was stripped off from the band and then laterally stretched at a stretching speed of 35%/min at a stretching ratio of 25% in an atmosphere at a temperature of 130° C. by using a tenter. Thus, a retardation film E was produced. At the point of starting the stretching, the residual solvent content was 60% by mass. The obtained film had a film thickness of 80 μm, Re(548) of 55 nm and Rth(548) of 197 nm.

Referential Example 6

Production of Retardation Film F

The procedure of Referential Example 2 was followed but changing the stretching ratio to 46% in preparing the retardation film B of Referential Example 2. Thus, a retardation film F was produced. The obtained film had a film thickness of 42 μm, Re(548) of 47 nm and Rth(548) of 117 nm.

Referential Example 7

<Production of Retardation Film G>

An Arton film (manufactured by JSR Corporation) was stretched at 170° C. by 10% in the width direction and 10% in the longitudinal direction to give a retardation film G. The obtained film had a film thickness of 85 μm, Re(548) of 115 nm and Rth(548) of 132 nm.

(Measurement of Thermal Expansion Ratio)

A coefficient of thermal expansion of a film was measured in terms of a dimensional change per 1° C. by elevating the temperature from 30° C. to 80° C. at a speed of 3° C./min under a load of 0.04 N by using TMA2940 (manufactured by TA Instrument).

Table 1 shows the results.

Referential Example 8

Saponification of Retardation Film A (Alkali Treatment of Film)

The retardation film A produced above was dipped in a 2.3 mol/L sodium hydroxide aqueous solution at 55° C. for 3 minutes. The film was then washed in a water washing bath tank at room temperature and neutralized with 0.05 mol/L sulfuric acid at 30° C. The film was again washed in a water washing bath tank at room temperature and further dried by hot air at 100° C. Thus, the surface of the retardation film A was saponified.

Saponification of Retardation Films B to F

The retardation films B to F were surface-saponified as in the retardation film A.

Referential Example 9

Surface Treatment of Retardation Film G

The surface of the retardation film G was made hydrophilic via corona discharge at 12 W min/m$^2$ using a corona discharge machine manufactured by KASUGA ELECTRIC WORKS Ltd.

Referential Example 10

Fabrication of Polarizing Plate (Saponification of Protective Film for Polarizing Plate>

A commercially available cellulose acetate film (FUJITAC TD80, manufactured by Fuji Photo Film Co., Ltd.) was dipped in a 1.5 mol/L sodium hydroxide aqueous solution at 55° C. for 1 minute. The film was then washed in a water washing bath tank at room temperature and neutralized with 0.05 mol/L sulfuric acid at 30° C. The film was again washed in a water washing bath tank at room temperature and further dried by hot air at 100° C.

(Fabrication of Polarizer)

Iodine was absorbed onto a stretched polyvinyl alcohol film to prepare a polarizer. The retardation film A produced in Referential Example 6 and the cellulose acylate film saponified in Referential Example 7 were bonded to both sides of the polarizer using a polyvinyl alcohol-based adhesive to give a polarizing plate (A). The transmission axis of the polarizing plate and the slow axis of the retardation film A were located in parallel to each other.

Referential Example 11

Fabrication of Polarizing Plates B to G

The retardation films B to G were treated as in Referential Example 7 to give polarizing plates B to G respectively.

Examples 1 to 5 and Comparative Examples 1 and 2

Fabrication of Liquid Crystal Display Device

A liquid crystal display device of Comparative Example 1 was fabricated by using a liquid crystal cell of VA-mode and bonding, respectively to the viewer's side and the backlight side thereof, the polarizing plate A as the second polarizing plate in FIG. 1 in such a manner that the retardation film A employed as the second retardation film was located in the liquid crystal side and the polarizing plate D as the first polarizing plate in such a manner that the retardation film D employed as the first retardation film was located in the liquid crystal side, via a pressure-sensitive adhesive. The transmission axis of the polarizing plate in the viewer's side was located vertically while the transmission axis of the polarizing plate in the backlight side was located horizontally to give a cross-Nicols configuration. Therefore, the liquid crystal device 1 of Comparative Example 1 is fabricated.

Further, the first polarizing plate and the second polarizing plate were changed as listed in Table 1 to fabricate the liquid crystal display devices 2 to 6 of the invention (Examples 1 to 5) and the liquid crystal display device 7 of Comparative Example.

(Evaluation of Unevenness in Continuous Lighting)

The liquid crystal display devices 1 to 7 fabricated above were lighted continuously for 1,000 hours. Then, the occurrence of unevenness in display accompanying light leakage was evaluated with the naked eye. The evaluation was made in accordance with the following criteria. A: No visible unevenness. B: Ratio of uneven areas to the entire screen area <20%. C: Ratio of uneven areas to the entire screen area ≧20%. Table 1 summarizes the results.

TABLE 1

| Liquid crystal display device | First retardation film | Second Retardation film | EC1max ($\times 10^{-6}$/° C.) | EC2max ($\times 10^{-6}$/° C.) | EC2max − EC1max | Unevenness After Continuous lighting | Remarks |
|---|---|---|---|---|---|---|---|
| LCD 1 | D | A | 49 | 104 | 55 | C | Comparison |
| LCD 2 | D | B | 49 | 90 | 41 | B | Invention |
| LCD 3 | E | B | 63 | 90 | 27 | A | Invention |
| LCD 4 | E | C | 63 | 75 | 12 | A | Invention |
| LCD 5 | F | B | 85 | 90 | 5 | B | Invention |
| LCD 6 | G | B | 72 | 90 | 18 | A | Invention |
| LCD 7 | C | C | 75 | 75 | 0 | C | Comparison |

A: No visible unevenness.

B: Ratio of uneven areas to the entire screen area <20%.

C: Ratio of uneven areas to the entire screen area ≧20%.

The results given in Table 1 indicate that the liquid crystal display devices 2 to 6 satisfying the requirements in the invention are preferred to the liquid crystal display device 1 and the liquid crystal display device 7 of Comparative Examples, because of showing little unevenness in display even after continuous lighting.

What is claimed is:

1. A liquid crystal display device comprising:
   a backlight;
   a liquid crystal cell;
   a first polarizing plate provided between the liquid crystal cell and the backlight;
   a second polarizing plate provided in opposite side to the first polarizing plate with respect to the liquid crystal cell;
   a first retardation film provided between the first polarizing plate and the liquid crystal cell; and
   a second retardation film provided between the second polarizing plate and the liquid crystal cell,
   wherein a relationship represented by the following formula (1) is satisfied:

$$1 \times 10^{-6}/°C. \leq EC2\max - EC1\max \leq 50 \times 10^{-6}/°C. \quad (1)$$

in which EC1max represents a maximal linear thermal expansion coefficient of the first retardation film, and EC2max represents a maximal linear thermal expansion coefficient of the second retardation film.

2. The liquid crystal display device according to claim 1, wherein a transmission axis of the first polarizing plate is substantially parallel to a slow axis of the first retardation film, and a transmission axis of the second polarizing plate is substantially parallel to a slow axis of the second retardation film.

3. The liquid crystal display device according to claim 1, wherein at least one of the first retardation film and the second retardation film serves as a protective film for the polarizing plate.

4. The liquid crystal display device according to claim 1, wherein at least one of the first retardation film and the second retardation film is a cellulose acylate film.

5. The liquid crystal display device according to claim 1, wherein at least one of the first retardation film and the second retardation film is a cellulose acylate film stretched in a width direction.

6. The liquid crystal display device according to claim 1, wherein the liquid crystal cell is a VA mode liquid crystal cell.

7. The liquid crystal display device according to claim 1, wherein a relationship represented by the following formula (1)' is satisfied:

$$2 \times 10^{-6}/°C. \leq EC2\max - EC1\max \leq 40 \times 10^{-6}/°C. \quad (1)'$$

in which EC1max represents a maximal linear thermal expansion coefficient of the first retardation film, and EC2max represents a maximal linear thermal expansion coefficient of the second retardation film.

8. The liquid crystal display device according to claim 1, wherein a relationship represented by the following formula (1)" is satisfied:

$$3 \times 10^{-6}/°C. \leq EC2\max - EC1\max \leq 30 \times 10^{-6}/°C. \quad (1)''$$

in which EC1max represents a maximal linear thermal expansion coefficient of the first retardation film, and EC2max represents a maximal linear thermal expansion coefficient of the second retardation film.

* * * * *